Patented June 2, 1953

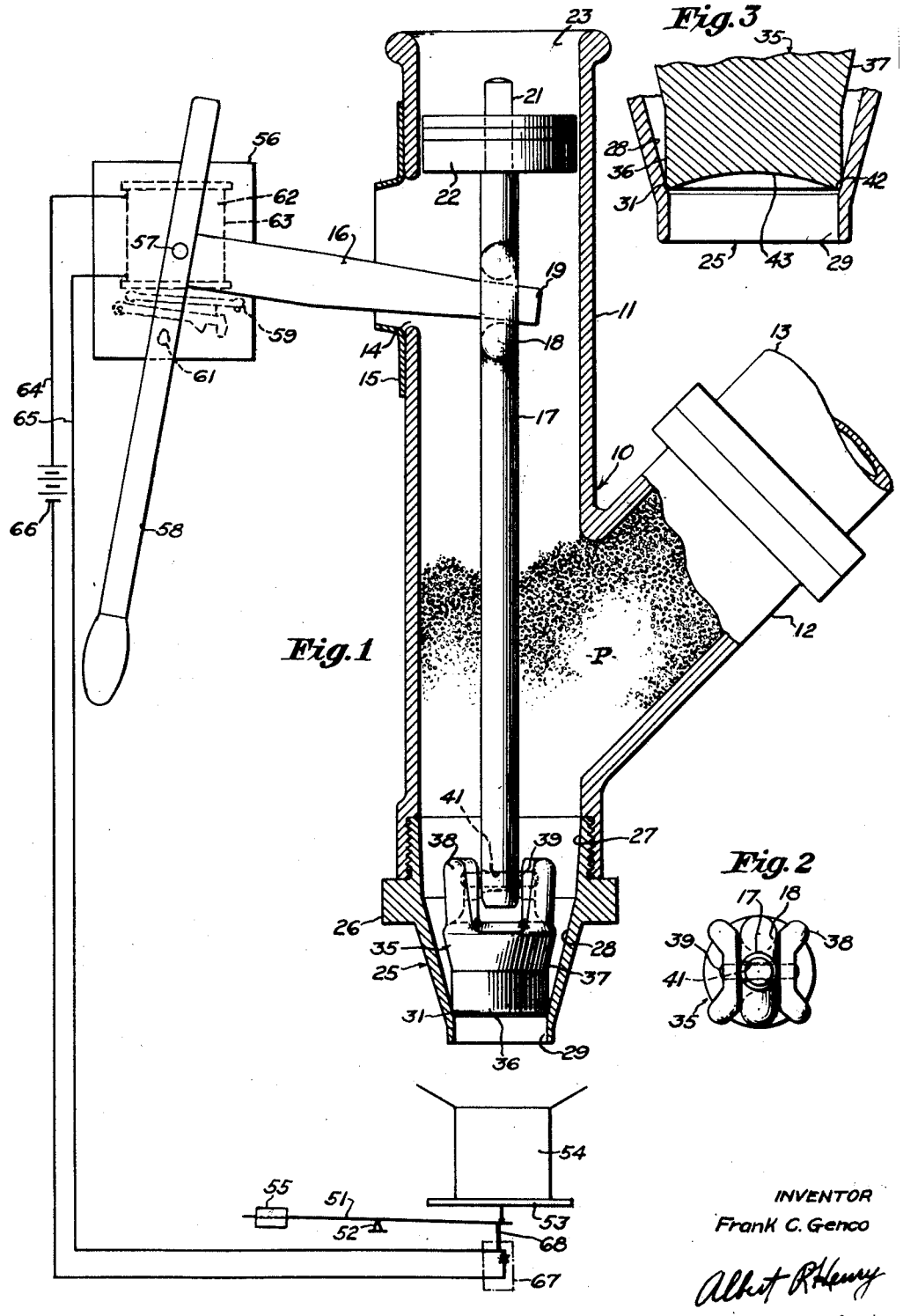

2,640,630

UNITED STATES PATENT OFFICE 2,640,630

SHUTOFF VALVE FOR AUTOMATIC WEIGHING MECHANISMS

Frank C. Genco, Buffalo, N. Y.

Application March 29, 1949, Serial No. 84,223

1 Claim. (Cl. 222—509)

This invention relates to an automatic shut-off valve for weighing or dispensing mechanisms, and it has for its object the provision of a valve which may be opened and closed either manually or automatically, to permit the filling of containers with powdered material.

It has heretofore been proposed to fill packages or containers of various sizes with solid or liquid material, which is introduced from a magazine or hopper under the control of a valve. It has also been proposed to make the valve closing operation more or less automatic, as for example, controlling the closure by a float when the dispensed medium is a liquid. While suitable devices are known for the mass or bulk measuring of liquids, a more difficult problem is presented in the mass dispensing of finely divided solids having cohesiveness and of a hygroscopic nature.

Typical examples of such materials are powdered detergents, which may be composed of several ingredients, each of which differs from the other in its physical properties. Thus, the composition may contain a granular constituent which, while freely flowing in one state, is also deliquescent, and tends to become cohesive. Another ingredient may be naturally more amorphous and tend to pack into lumps or larger masses. When such materials flow through the orifice of a dispensing opening, they accordingly tend to adhere to the walls thereof, form a coating or cake on the valve element and its seat, and thus prevent positive closure. Such action results in leakage and loss, improper filling of the packages, and the rejection of a high percentage which are either over or under weight.

I have discovered that a positive shut-off valve, suitable for use with powdered materials, may be so devised that it will not cake or pack, or fail to seat tightly, even when employed with difficult materials. Such valve therefore permits predetermined weight dispensing, as well as bulk filling of containers. The valve is also herein described as applied to a weighing dispensing apparatus, wherein provision is made for either manual or automatic operation, thereby adapting the invention to packaging machines of various types.

The invention will be more fully understood from a perusal of the following description of a preferred embodiment, illustrated in the accompanying drawing, wherein:

Fig. 1 is a longitudinal section through the valve, with a weighing scale and electrical control devices being shown in schematic form;

Fig. 2 is a top plan of the valve element and stem; and,

Fig. 3 is an enlarged fragmentary section through the lower portion of the valve element and seat.

The valve comprises a casing 10 including a body 11, of generally elongated cylindrical form, and an inclined entrance chute 12 immediately above the lower end of the body 11, thus providing a casing having the general form of a Y-branch or lateral pipe fitting. The casing is intended, for the application herein described, to be mounted in a substantially vertical position, with the chute 12 extending laterally upwardly. The end of the chute is coupled to spout 13 of an overhead magazine, not shown, in which is contained the material to be dispensed.

The upper portion of the casing is formed with a side opening 14, which may be shielded with a bushing or sleeve 15, and through which extends one end of an operating lever 16. A link 17 is disposed axially in the casing 10, and it is formed with an eye 18 adjacent the opening 14 to provide a loose bearing for the inwardly extending end 19 of the lever 16. The upper extremity of the link 17 may be formed with a reduced section 21 on which is mounted an accelerating weight 22, which may be made in several pieces so that its mass may be readily varied by addition or removal of the sections. Access to the weights is had through the upper open end 23 of the casing 10. These weights need not have a running fit with the internal wall of the casing—in fact, it is desired at least to provide some clearance therebetween, so that the air pressure within the casing will remain at barometric as the link 17 and weights 22 reciprocate. If a running fit is provided, so that the weights have some effect as a guide bearing, then an air opening or breather hole should be provided adjacent the shield 15.

The lower end of the casing 10 is advantageously internally threaded to receive an externally threaded nozzle 25, formed with a grip section 26 on its exterior wall to facilitate assembly and removal. The bore of the nozzle 25 is composed of a cylindrical section 27, and with a smooth frusto-conical velocity accelerating section 28 which merges into a cylindrical discharge orifice 29. As is shown more clearly in Fig. 3, the junction of the conical section and orifice is formed with a very slight shoulder 31, which constitutes the valve seat proper. For valves having sizes and proportions such as are indicated in the drawing, this shoulder will be of the order of a few ten-thousandths of an inch projection beyond the trace of the adjoining cone, and it may be formed in the manner hereinafter described.

The valve element 35, which seats within the conical section 28 and against the seat 31, comprises a cylindrical plug portion 36 merging into a tapered section 37 whose upper end is scalloped or castellated to form lugs or ears 38. The ears are drilled at diametrically opposed points to receive a pin 39, whose central portion passes through an oversized aperture 41 in the lower end of the link 17. It will be noted in Fig. 1 that the end of the link 17 does not engage the end of the tapered section 37, and that there is clearance between the lugs 38. These provisions are made to enable powder to drain from the top of the valve element 35, rather than pack tightly therein. The connection between the link 17 and valve element 35 is in the nature of a universal joint, in which there is freedom of movement in the radial direction around the pin 39, and limited but significant freedom of movement in the axial direction, due to the loose fit between the pin and the aperture 41.

As best shown in Fig. 3, the seating end of the plug 36 is formed with a slightly rounded periphery 42, which may be turned on a radius of a few thousandths of an inch. It is highly desirable to provide such shoulder if the best results are to be obtained. It has been found that sharp or so-called "knife edge" seats are unsatisfactory with certain materials, whereas no powdered substance has as yet been encountered for which the rounded seat has not been suited. The end face of the plug portion is also made slightly concave, as indicated by the numeral 43, to minimize particle adhesion.

It will be understood that the operating action of the valve involves the raising and lowering of the element 35 within the nozzle 25, thus disengaging and engaging the rounded end 42 and the shoulder 31. After the nozzle and valve element have been formed, and from a suitable material such as tool steel, they are heat treated to impart some hardness, and finally ground and lapped. The lapping process is included to provide full concentricity, and it forms the minute seat 31 previously referred to.

As noted above, the valve may be operated either manually or automatically. For simple manual operation, the attendant simply depresses the outer end of the lever 16 to open the valve, and releases it as desired, to let the valve close by gravity under the cumulative weight of the element 35, link 17, and accelerating weights 22. For semi-automatic operation in connection with filling to a predetermined weight, the system illustrated schematically in Fig. 1 may be employed.

A weighing scale having a beam 51 mounted on a pivot 52 is positioned with its pan 53 underneath the orifice 29, and it is adapted to receive a container 54 which is to be filled with the powdered material P contained in the valve casing 10. The beam 51 is provided at its opposite end with an adjustable counterweight 55, to regulate the accuracy of the balance. The lever arm 16 extends to a control box 56, where it is pivoted on a shaft 57, to which is also connected a depending lever arm 58, constituting a manually operated handle. A gravity or spring actuated latch 59 is pivotally mounted to engage a pin 61 on the lever 58 when the lever is swung to lift the valve element 35, and thereby hold the valve open until the latch is disengaged.

The control box 56 also contains a solenoid 62 whose armature 63 is mechanically connected to the latch 59, so that, when the solenoid is energized, the latch is lifted from the pin 61 to release the valve. The circuit for the solenoid includes a pair of line wires 64 and 65, leading from the solenoid terminals through a power source 66 to the contacts of a micro-switch 67. These contacts are normally open, but are closed by a finger 68 attached to the beam 51 of the scale as the container 54 becomes filled. By simple adjustment, the latch 59 may be released to close the valve at that instant which will assure correct weight. It is obvious without further illustration or description that additional circuits may be provided, if desired, to open the valve when the pan 53 is slightly depressed by the weight of the box, thereby making the operation substantially fully automatic.

The valve has been found to fulfill its intended purpose of effecting positive closure, and assuring accurate weight, when used as a dispensing valve for pulverulent materials. While the fact of successful operation is not dependent upon any matter of theory, it is believed that the functioning of the valve is substantially as follows. It has been noted that the upper end of the valve is open to the atmosphere, and it might therefore be inferred that the solid material P, flowing by gravity from an overhead reservoir through the chute 12, would be forced up the casing 10. This, however, does not occur except to a limited extent, and the eye 18 of the link 17 does not become immersed in the powder. Hence, this connection is loose and free, permitting rapid and easy action.

The powder, of course, packs itself above the valve element 35, and in the narrowing gap between the element and the conical portion 28 of the nozzle 25. It also gets around the lower end of the link 17, and in the interstices between the lugs 38. However, as the element 35 is raised, the wiping action of the valve on the contacting powder appears to be transmitted to the more or less cohesive particles between the element 35 and conical bore 28, thus cleaning the nozzle automatically. Stated otherwise, the greater the tendency of the particles to pack and stick, the more is the force tending to pull them away from the internal walls and surfaces. During the same upward motion, the movement of the valve assembly and powder particles relative to each other causes the valve element 35 to be canted or wobbled about its loose connection with the link 17. This has the effect of freeing or dislodging the particles which have wedged themselves around the connection, and, while such particles are immediately replaced, the movement keeps the link 17 and element 35 from binding. It has been noted, for example, that if a fairly tight connection is employed, without provision for particle drainage and replacement, that the valve will tend to bind and fail to seat tightly.

The flow of the material around the valve element 35 into the container 54 is in the nature of an accelerated flow. Inasmuch as the minor diameter of the conical section 28 is on the downstream or outlet side of the valve, there is an increase in velocity of flow proportionate to the reduction in cross section. This effect opposes the tendency of the powder to adhere to the bore of the nozzle, or to form a cake on the very slight lapped area 31. When the valve element drops under the influence of gravity, it is moving in the same direction as that of the flowing material, and its lower end is also progressively diminishing the annular orifice, between the plug section 36 and the conical wall 28, through which the flow occurs. There is accordingly a progressive reduction in volume of flow, or partial valve closing, terminated by an abrupt shearing through the diminishing stream, a plunger-like ejection of the last particles into the orifice 29, and a positive seating on a clean valve seat 31. It has been consistently found, upon removal of the nozzle 25 after a prolonged period of use, that the side walls of the valve element 35 and the bore of the nozzle 25 are relatively free and clean from an adherent coating, even though the material which has been dispensed is cohesive and adhesive in nature.

While the invention has been described in detail with reference to a preferred embodiment, it will be understood that its principles may be applied in other forms, and it is accordingly intended to encompass all those modifications and variations which fall within the scope of the following claim.

I claim:

A positive closure dispensing valve comprising an elongated valve casing, a nozzle connected to the casing at one end thereof, said nozzle being formed with an outwardly converging conical bore merging into a discharge orifice at the end of the nozzle, the junction between the bore and orifice being defined with a slight circular seating region, a valve element including a cylindrical plug having a slightly rounded and cupped end face adapted to seat on said region, the opposite end of the valve element being formed with lugs, a link loosely mounted between the lugs for rocking movement with respect thereto, said link extending lengthwise of the casing, a detachable accelerating weight on the end of the link adjacent the opposite end of the casing, a side opening formed in the casing below the weight, an operating lever projecting through the opening and connected to the link, an inlet chute formed in the casing between the side opening and the valve element, and an atmospheric air passage formed in the casing above the chute.

FRANK C. GENCO.

References Cited in the file of this patent

UNITED STATES PATENTS

| Number | Name | Date |
|---|---|---|
| 670,696 | Willers | Mar. 26, 1901 |
| 1,051,736 | Holder, Jr. | Jan. 28, 1913 |
| 2,315,376 | Packwood, Jr. | Mar. 3, 1943 |